(12) United States Patent
McCormack (10) Patent No.: US 7,139,381 B2
(45) Date of Patent: Nov. 21, 2006

(54) METHOD AND APPARATUS FOR INITIATING TELEPHONY CONTACT

(75) Inventor: Tony McCormack, Galway (IE)

(73) Assignee: Nortel Networks Limited, St. Laurent (CA)

( * ) Notice: Subject to any disclaimer, the term of this patent is extended or adjusted under 35 U.S.C. 154(b) by 540 days.

(21) Appl. No.: 10/179,656

(22) Filed: Jun. 25, 2002

(65) Prior Publication Data

US 2003/0235288 A1 Dec. 25, 2003

(51) Int. Cl.
*H04M 3/42* (2006.01)
*H04M 3/48* (2006.01)
*H04M 3/523* (2006.01)

(52) U.S. Cl. ............... 379/207.02; 379/210.01; 379/265.09; 379/265.11; 379/266.01

(58) Field of Classification Search ............... 379/265.01–266.1, 207.02, 209.01, 210.01, 379/355.01
See application file for complete search history.

(56) References Cited

U.S. PATENT DOCUMENTS

| | | | | |
|---|---|---|---|---|
| 4,166,929 A | * | 9/1979 | Sheinbein | 379/209.01 |
| 5,181,236 A | * | 1/1993 | LaVallee et al. | 379/88.22 |
| 5,812,638 A | * | 9/1998 | Muller | 379/88.09 |
| 5,884,032 A | * | 3/1999 | Bateman et al. | 709/204 |
| 6,002,760 A | * | 12/1999 | Gisby | 379/266.01 |
| 6,665,396 B1 | * | 12/2003 | Khouri et al. | 379/265.01 |
| 2001/0038624 A1 | * | 11/2001 | Greenberg et al. | 370/352 |
| 2004/0062379 A1 | * | 4/2004 | O'Neil | 379/265.01 |

* cited by examiner

*Primary Examiner*—Harry S. Hong
(74) *Attorney, Agent, or Firm*—Barnes & Thornburg LLP (57) ABSTRACT

A trigger signal from a remote location can be used to automatically trigger a call from a telecommunications device. The device is preferably a programmable telephone which stores a dialling program which monitors a communications channel for a trigger signal. The user, who may be a call centre customer, selects an option to automatically initiate a call rather than holding for an agent. The call centre system then places a contact request in the call queue alongside identifiers relating to real time holding calls. When the contact request reaches the top of the queue, a trigger signal is sent to the customer's device where it activates the dialling program, causing a call to be made to the call centre. This incoming call is recognised at the call centre as relating to the contact request at the top of the queue and the call is connected directly to an agent, bypassing the other holding calls.

23 Claims, 4 Drawing Sheets

METHOD AND APPARATUS FOR INITIATING TELEPHONY CONTACT

FIELD OF THE INVENTION

This invention relates to the automatic initiation of telephony contacts.

Background Art

Many telephony services are provided by call centres where a limited number of agents must deal with any incoming calls. Due to the costs of providing suitably trained agents, there is a pressure on enterprises managing such call centres to keep the number of agents down. Competing with this is a pressure to retain and satisfy customers. Too few agents results in long delays being experienced by customers on hold, whereas too many agents results in high personnel and training costs.

In addition, because keeping a proportion of customers on hold is seen as a necessity at busy times, it is necessary to have a sufficient number of lines to handle the calls being actively dealt with by agents and the calls being held. This also increases costs to the enterprise.

One method of dealing with this which has been proposed is to enable some or all of the customers to request a call-back when an agent is free. This however results in increased telephony costs to the enterprise since it is responsible for making a larger number of calls. More importantly, there is no guarantee that the customer will be in a position to speak with the agent when the call-back is made, as the customer is not guaranteed a particular time for the call-back and the customer may be otherwise engaged. Generally, establishing that the customer is not in a position to speak with the agent will nevertheless require agent time to be expended in the call, and this ties up the valuable agent resources.

The present invention addresses these issues and has as an object the provision of improved methods of initiating telephony contact, in particular (but not exclusively) in the context of call centre interactions with customers.

SUMMARY OF THE INVENTION

The invention provides a method of initiating a telephony communication from a telecommunications device to a target. The steps of the method include:
 a) submitting a request to the target to provide a trigger signal;
 b) monitoring a communications channel for receipt of the trigger signal; and
 c) upon receipt of the trigger signal, initiating the communication to the target.

Using the method of the invention, a trigger signal from a remote location can be used to automatically trigger a call from a device. Thus, rather than calling a call centre and remaining on hold, a customer having a suitable telephone or other telecoms device can request a call initiation trigger from the call centre. When the centre is ready for the customer, it sends the trigger, and the customer's device, which has been monitoring a channel for the trigger, is caused to make the call.

In contrast to holding on the line, this represents a time saving for the customer. It also represents a reduction in resources required by the centre to service all of its customers. For example a call centre with 1000 active agents may require many more than 1000 incoming telephone lines to accommodate not only the calls being dealt with by agents but also the callers on hold at the same time. If callers can be caused to automatically call the centre at the right time, fewer lines are required, since the number of holding callers can be reduced.

Also, rather than a system in which the customers can request a call-back (which greatly increases telephone bills for the call centre, the invention provides a method for causing the customer to call back the centre at a suitable time.

The trigger signal can include a telephony identifier which identifies the target and enables communication with the target to be initiated.

A user's device can be provided with the hardware and/or software to carry out the steps of the invention as a general feature, and if the invention is supported by a wide range of targets (e.g. call centres and other telephony-based services) the trigger will identify the particular target to be called.

Examples of "telephony identifiers" are a telephone number of the public switched telephony network (PSTN), a private telephony network directory number, or a data network address (e.g. an IP address where the call-back is made using an Internet telephony device).

The invention is applicable to non-voice telephony, including video calls, instant messaging systems, and text-assisted calls for the hard of hearing.

The telephony identifier can alternatively be provided to the device beforehand, rather than in the trigger signal, to identify the target and enable communication with the target to be initiated, so that the already present telephony identifier is used to initiate the communication on receipt of the trigger signal. For example, if the invention is implemented by downloading a specific application from each target every time, then this information can be built into the application instead and the trigger can be correspondingly simpler. Alternatively, when the trigger request is issued from the device, confirmation of receipt from the target could include dialling instructions or other means of allowing communication to be automatically initiated when the trigger is received. In a preferred embodiment, an executable component is downloaded permanently to the device, and this component receives the telephony identifier in the trigger signal each time an automated call is triggered according to the invention.

The device can have a number of communications channels so that the trigger signal is received over a different channel to the channel used to initiate the communication. As an example, many mobile handsets now support a number of different communication protocols (e.g. both the global system for mobiles (GSM) protocol and the general packet radio services (GPRS) protocol, or both GSM and 3G protocols). Such devices might receive the trigger over their respective wireless Internet protocol (GPRS or 3G) and then initiate the call using GSM. This has a particular advantage in that while the call can be made using GSM, the Internet access protocol can be "always on" and thus available to receive the trigger without necessarily tying up the resources of the device. The invention can also be implemented in a portable or desktop computer connected to the Internet, in which case a port can be set up to listen for the trigger while one or more different ports are used for IP telephony or Internet browsing. Other possibilities will present themselves to the skilled person and will become apparent with the emergence and convergence of further technologies.

Thus, two preferred types of device are telephones having programmable capabilities (such as 3G phones which can download and run software applications) and computers having telephony capabilities. Other examples include personal digital assistants (PDAs) and ethernet handsets.

The invention also provides a telecommunications device having:
a) an interface for submitting a request to a target to provide a trigger signal;
b) a communications channel monitor for detecting receipt of a trigger signal from the target over a communications channel; and
c) an automated contact system for initiating a telephony communication to the target upon receipt of the trigger signal.

In another aspect the invention provides a computer program for a programmable telecommunications device, which causes the device to:
a) monitor a communications channel for receipt of a trigger signal from a target; and
b) upon receipt of the trigger signal, initiate a telephony communication to the target.

Preferably, the program is in the form of an applet for interpretation by a command processor embodied in the device.

A further aspect of the invention provides a method of operating a call centre. This method includes the steps of:
a) receiving a contact request relating to a remote device;
b) prioritising the request according to a set of rules to determine when the request is due to be processed;
c) at that time, forwarding a trigger signal to the remote device to cause the remote device to initiate a telephony communication with the call centre; and
d) associating an incoming telephony communication with the contact request and directing the incoming communication to an agent.

This aspect of the invention provides the call centre with the ability to receive contact requests from customers, queuing these until the appropriate time, when an agent is about to be freed, and then triggering the customer's device to make contact. When the triggered call is received, the call centre recognises this as relating to the request and forwards the call to an agent as soon as possible.

In effect the contact request can take a place in the queue of calls on hold (or a queue consisting solely of contact requests can be maintained). The customer, by requesting a trigger signal, is effectively letting a contact request act as a virtual call on hold in the queue, and when the corresponding held call would normally be sent to an agent (or shortly beforehand, to allow time for the device to make the call and be recognised at the call centre), the trigger signal is sent to the device.

Step a) may involve receiving the request from a request processing device such as a web server, an interactive voice response server, a short messaging system server, an email server, or a session initiation protocol (SIP) server.

Preferably, the identity of the device to which the request relates is determined with reference to a database of call centre customers.

Instead of queuing the request with other requests or real time calls in the call queue, step b) can be accomplished by scheduling the request for processing at a time specified in the request and processing the request at the specified time. Thus a customer might access the call centre's website, choose a time from a number of available time slots (determined with reference to the projected activity levels of the call centre at different times), and by selecting an available slot the web server receiving this request generates a contact request in a timed request list. As the call centre system is processing the call queue, it checks whether any calls are currently due to take place according to the timed request list, and if so, these calls are processed first by generating the trigger signals to the devices specified in the contact request. (Again, depending on the expected delay between issuing the trigger signal and receiving the corresponding call from a device, the timed calls can be processed slightly ahead of time.)

Step a) can include the step of transmitting to the remote device a program which when run by the device (i) monitors a communications channel for the trigger signal and (ii) reacts to the trigger signal by initiating communication with the call centre.

Thus, a customer might choose to employ the method of the invention (e.g. by selecting a link on the website of the call centre), and this link would be interpreted by the web server as a request to upload the executable software component (e.g. an applet) to the customer's device. The executable component would then be activated on the device and would monitor for the trigger signal.

Step d) of the call centre method preferably involves receiving notification of an incoming call, determining from the information in the notification whether the call relates to an existing request, and if the call does not relate to an existing request, creating and prioritising a new request relating to the call.

Most call centres have a call server (e.g. a PBX) which receives and holds calls, with the call centre queuing system receiving notification of the calls from the PBX and placing tokens in a queue. When the token reaches the top of the queue, the call centre software instructs the PBX to transfer the held call corresponding to this token to a particular extension (that of the agent who has most recently become free). The present invention can implement this same method, with the distinction that the PBX notifies the call centre system of the origin of each call (e.g. using caller line identification (CLID) or using the originating IP address of the device), and this information is compared by the call centre system to determine if it relates to a contact request at the top of the queue. If the call is determined to relate to such a request for which a trigger signal was recently issued, then the PBX is instructed to direct the call to an agent extension, whereas if it is not, the PBX is told to treat the call in the normal way.

Preferably, therefore, to implement the method in this way, the requests are prioritised by a queue management unit, and incoming calls are managed by a switching device operative under the direction of the management unit to hold or forward received calls, the queue management unit instructing the switching unit to hold calls which do not relate to an existing request until that request is processed.

The invention provides, in a further aspect a call centre comprising:
a) a management system for receiving, prioritising and processing contact requests relating to remote devices;
b) a trigger signal generation unit for generating and transmitting a trigger signal to a remote device when a contact request relating to that device is processed; and
c) a call recognition system for associating an incoming call with a processed contact request relating to the device making the incoming call; and
d) a call switching unit for forwarding an incoming call to an agent under the direction of the call recognition system.

The invention further provides a computer program product comprising instructions which when executed in a call centre computer system are effective to cause the system to:
a) receive a contact request relating to a remote device;

b) prioritise the contact request according to a set of rules which determine when the request is due to be processed;

c) when it is determined that the contact request is to be processed, forward to the remote device a trigger signal for causing the remote device to initiate a telephony communication with the call centre; and d) associate an incoming telephony communication with the contact request and directing the incoming communication to an agent.

In a further aspect the invention provides a method of initiating a call between a telecommunications device and a call centre, the method comprising:

a) the call centre receiving a contact request to provide a trigger signal to the device;

b) the call centre prioritising the contact request according to a set of rules which determine when the request is due to be processed;

c) when it is determined that the contact request is to be processed, the call centre forwarding to the remote device a trigger signal for causing the remote device to initiate a telephony communication with the call centre;

d) the telecommunications device monitoring a communications channel for receipt of the trigger signal;

e) upon receipt of the trigger signal, the telecommunications device initiating the communication as a call to the call centre; and f) the call centre associating the incoming call with the contact request and directing the incoming communication to an agent.

The invention also provides a telecommunications system comprising a telecommunications device and a call centre connected to one another over a telephony network, wherein the device comprises:

a) an interface for submitting a contact request to a target to provide a trigger signal;

b) a communications channel monitor for detecting receipt of a trigger signal from the target over a communications channel; and c) an automated contact system for initiating a telephony communication to the target upon receipt of the trigger signal. and the call centre comprises:

d) a management system for receiving, prioritising and processing the contact request;

e) a trigger signal generation unit for generating and transmitting the trigger signal to the device when the contact request relating to that device is processed; and f) a call recognition system for associating the telephony communication when received as an incoming call with the processed contact request relating to the device; and g) a call switching unit for forwarding the incoming call to an agent under the direction of the call recognition system.

DETAILED DESCRIPTION OF BEST MODE(S)

Figure 1:
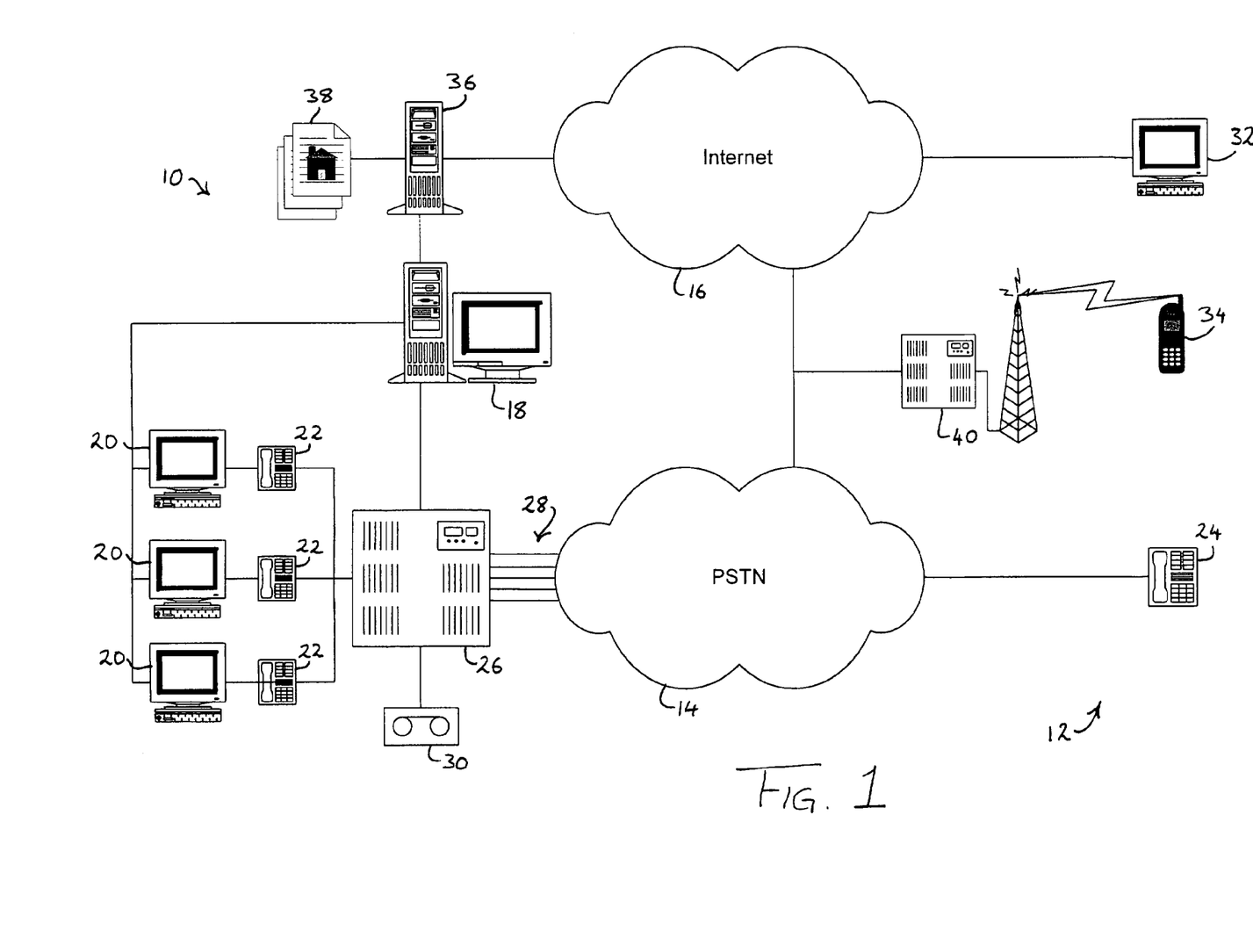
FIG. 1 is a network diagram illustrating a system according to the present invention.

FIG. 1 shows system according to the present invention comprising a call center, indicated generally at 10, a set of customer telecommunications devices, indicated generally at 12, and a public switched telephone network (PSTN) 14 and wide area network (Internet) 16, both for connecting a customer at 12 to the call centre 10.

The call center 10 comprises a call queue manager 18 which maintains a queue of calls, emails, and other communications arriving at the call centre, and distributes these communications to agents each located at a workstation 20 having a telephone handset 22. The present invention concerns itself primarily with calls and other telephony communications rather than emails.

As in a conventional call centre, a call made from a customer's remote telephone 24 via the PSTN 14 arrives at a private branch exchange (PBX) 26 on one of a set of incoming lines 28 assigned by the PSTN to the call centre. The customer will often be directed to an interactive voice response (IVR) unit 30 where a set of menu choices allow certain calls to be dealt with without agent intervention. The IVR unit 30 may also be used to determine the nature of a query allowing the call to be prioritised and/or ultimately routed to an agent having the appropriate skills to deal with the call. When the customer has traversed a set of IVR menu choices indicative that the call should be routed to an agent, the call will be held at the PBX 26 and the set of menu choices made in the IVR process, along with other information, such as caller line ID, and any DTMF inputs made by the caller to an automated system such as the IVR unit, are presented to the call queue manager, together with an ID number assigned by the PBX to the held call.

The call queue manager 18 evaluates the information presented by the PBX system and the resources available to it (e.g. whether any agents are available with the appropriate skillset), and arrives at a decision as to how the call is to be handled. In many cases, the decision arrived at is to enter the call in a call queue. In practice, this means that the call queue manager creates a file or token including the information received from the PBX, and places it into a queue of such files (there can be a single queue, or a number of queues, each for a specific subset of agents with the appropriate skillsets for that queue).

Physically at this point in time, the call is held at the PBX pending further instructions from the call queue manager to the PBX.

When the token relating to this call reaches the top of the queue and an agent becomes available, the call queue manager 18 instructs the PBX 26 to transfer the call to the relevant telephone terminal 22 for that agent and simultaneously may present the agent's workstation with any relevant information regarding the call. The agent accepts the call and the token is cleared from the queue. Thus far, the system described is a conventional call centre system.

The invention allows a user to bypass this waiting time, by placing a contact request with the call centre 10 and then awaiting receipt of a trigger signal which will cause one of the telecoms devices 12 to automatically initiate a call.

One example of how this can be achieved is by use of the Internet 16 which can be used to connect an Internet enabled phone 34 to a web server 36 associated with the call centre 10. In describing this exemplary method, reference is also made to FIGS. 2–5 which illustrate the processes occurring in the customer's programmable phone, the web server, the call queue manager and the PBX, respectively. Where complementary steps occur at two of these interacting components (such as the phone accessing the web server), the same reference numeral will be used (e.g. step 50 in FIGS. 2 and 3).

Figure 2:
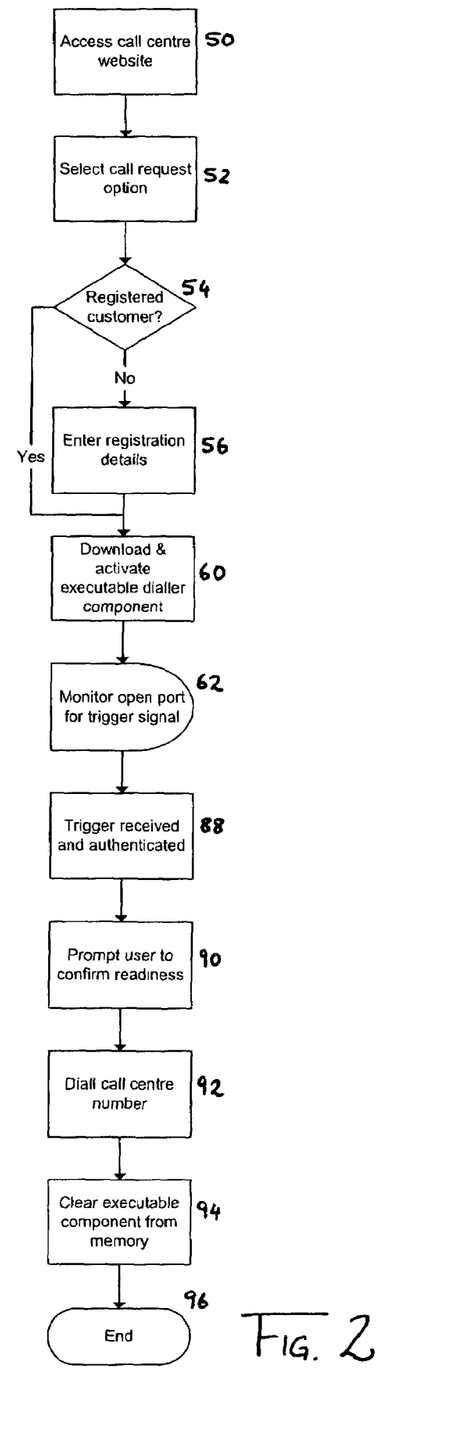
FIG. 2 is a flowchart illustrating the steps of a method according to the invention carried out on a telecommunications device.
Figure 3:
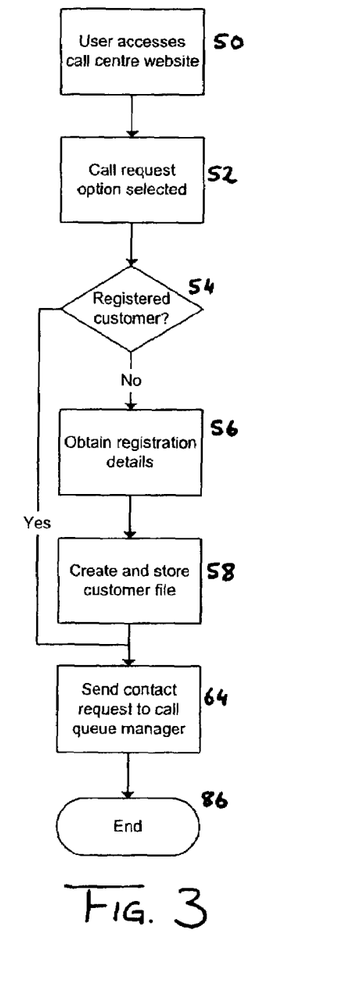
FIG. 3 is a flowchart illustrating the steps of a method according to the invention carried out on a web server associated with a call centre.

Referring first to FIGS. 2 and 3, a customer accesses the web server 36 with an Internet enabled phone 34 (such as a 3G or GPRS mobile handset), step 50. The customer uses the phone to navigate the site and access a number of web pages 38 maintained by the server 36. When the customer selects the option to have an automatic call initiation by clicking on a link on a page 38, step 52, this action is interpreted by the web server as a request to download a small program such as a Java applet to the phone 34 (Java is a trade mark of Sun Microsystems). Before allowing the download, the web server first checks, step 54, whether the customer is a previously registered user of the website (e.g. by presenting a login screen). If the customer is not registered, a registration process ensues, step 56, in which the customer inputs registration details (name, contact number, etc.) and the web server records the IP address of the device.

The web server stores these contact details in a customer file, step 58, and the customer is then permitted to download a dialler executable component which is immediately activated on the customer's phone, step 60.

When the executable component is downloaded to the phone it maintains an open port on an Internet connection, awaiting the receipt of a trigger signal, step 62. At this point, the user need do nothing further for the time being, since the downloaded application will take control of monitoring the open channel.

Referring to FIG. 3, the web server notifies the call queue manager that a contact request has been received from the customer, step 64, by sending a contact request file to the call queue manager. This can be a simple file including only a pointer to the customer record which can be in a database shared between the web server and the call queue manager, or it can include the contact details received during registration.

The web server takes no further action at this point until a further user accesses the website, at which time the process starts again. To follow the process, reference is made to FIG. 4, detailing the processes running on the call queue manager 18. The call queue manager maintains a call queue containing both tokens relating to real time calls on hold at the PBX 26 and contact requests received from the web server (and other sources). A call token is received from the PBX, step 66, when a call is placed on hold, with the token providing an ID number assigned internally by the PBX (this may, for example be the external line number on which the call was received). As indicated above, a contact object is received, step 64, when a registered customer initiates a communications request. In the simplest queues, each request or token is added to the end of the queue, step 68, and the call queue manager monitors both the queue and the identities of agents becoming available, and assigns the top call token (or contact request) in the queue to the next available agent, step 70.

Figure 4:
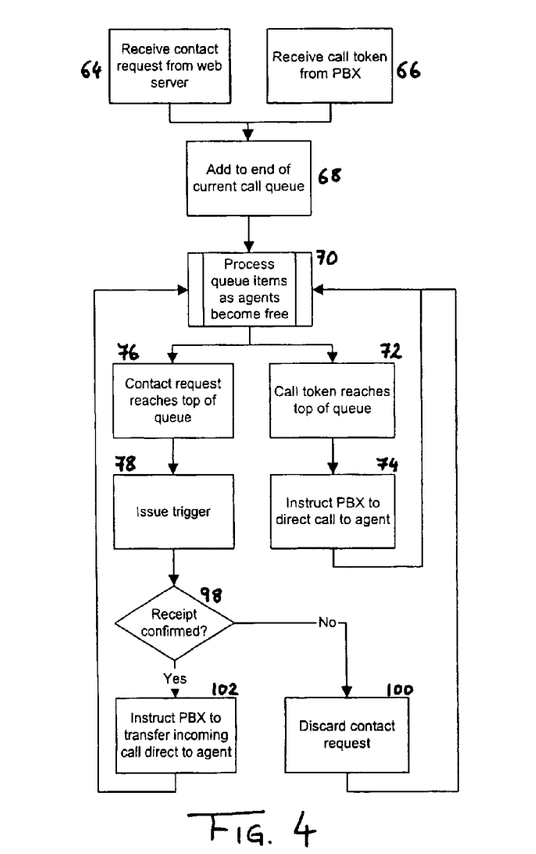
FIG. 4 is a flowchart illustrating the steps of a method according to the invention carried out on a call queue management device of a call centre.

If the top item in the queue is a call token, step 72, the PBX is instructed to transfer the held call identified in the token to the agent who has been identified as coming available, step 74 (possibly after a short delay to provide agents with a break between calls), and the process returns to step 70.

If however the item reaching the top of the queue is a contact request, step 76, the call queue manager will identify the customer using information stored in the contact request and issue a trigger signal via the internet to the customer's device.

The call queue manager determines the address to which the trigger signal is to be sent from the customer's details and sends a predefined trigger signal to this address, step 78, where it is received by the listening application on the device. If the communications protocol provides for confirmation of received packets, the call queue manager may monitor for confirmation of receipt by the phone, step 98. This is intended to cater for situations in which a device is no longer receptive to the trigger signal, so that the call queue manager can be alerted that the device did not receive the trigger and therefore will not make the expected call. This ends the process on the web server, step 86.

When the trigger signal is received at the device, step 88 (FIG. 2), the application may authenticate the source of the trigger signal to prevent unauthorised parties from remotely accessing the dialling functions of the phone. For example, the dialler executable component can contain an encryption key which is used to decrypt the trigger signal; other authentication methods will readily present themselves to the skilled person.

The program or applet is designed to access the GSM dialling functions of the phone. before doing so, it may alert and prompt the user, step 90, for confirmation to proceed with dialling. The reason for this is that the trigger signal only issues from the call centre when an agent is available to take the call, so it is preferred for the dialler program to only make the call if the user is ready. The phone, under control of the executable component, dials the conventional phone number of the PBX 26, step 92, and thereby connects the phone via a GSM basestation 40 (FIG. 1) and the PSTN 14 to the PBX 26. (One of the advantages of the invention is that until the trigger signal is received the customer can go about normal activities, other than maintaining an open port and an Internet connection. If appropriate the customer may continue to use the phone as normal.)

From the user's point of view, therefore, the process involves accessing the website, downloading a small executable component, and upon being alerted that the call is ready to be placed, confirming that the call should proceed, following which he or she will be placed directly in contact with an agent, in the manner explained further below.

It may be preferred to clear the executable component from the memory of the phone as soon as the call is placed, step 94, again to remove remotely accessible dialling functions from the phone. This ends the process as regards the customer's telecommunications device, step 96. As an alternative, to clearing the executable component from memory, the application can be stored on the phone for further use, to shorten the process the next time the call centre is contacted. Furthermore, if security issues do not dictate otherwise, the dialling application can be supplied in the firmware of the phone, rather than downloaded in step 60, and this function can be used on a wide range of sites. In such cases it is envisaged that there is a comprehensive set of checks in place to ensure that the application is only activated to receive triggers from the correct sources, or that a time-out function is built into the application to deactivate it after a period has elapsed.

Referring again to FIG. 4, when the call queue manager instructs the web server to issue the trigger, step 78, it then awaits the confirmation of receipt to be confirmed by the server as described above, step 98. If confirmation of receipt by the remote device is not received from the web server before a given time has elapsed, the contact request is discarded as being no longer valid, step 100, and the process on the call queue manager reverts to step 70. As an alternative to discarding the request entirely, the contact request could be demoted (one or more times) a set number of places down the queue (or to the end of the queue) and the process repeated from step 76 when it reaches the top of the queue again. This would allow the system to try contacting the user a number of times to allow for the fact that the connection may have been only temporarily lost despite the fact that the customer may still wish to make contact with the call centre. In such cases the contact request might include a running tally of the number of retries, and be ultimately discarded after a set number of retries.

If receipt is confirmed in step 98, then the call queue manager instructs the PBX, step 102, to transfer an incoming call from the device to which the trigger was sent, directly to a specified agent. This can be done by notifying the PBX of the calling line identification (CLID) of the device (stored in the contact request itself or in the customer's database file).

Figure 5:
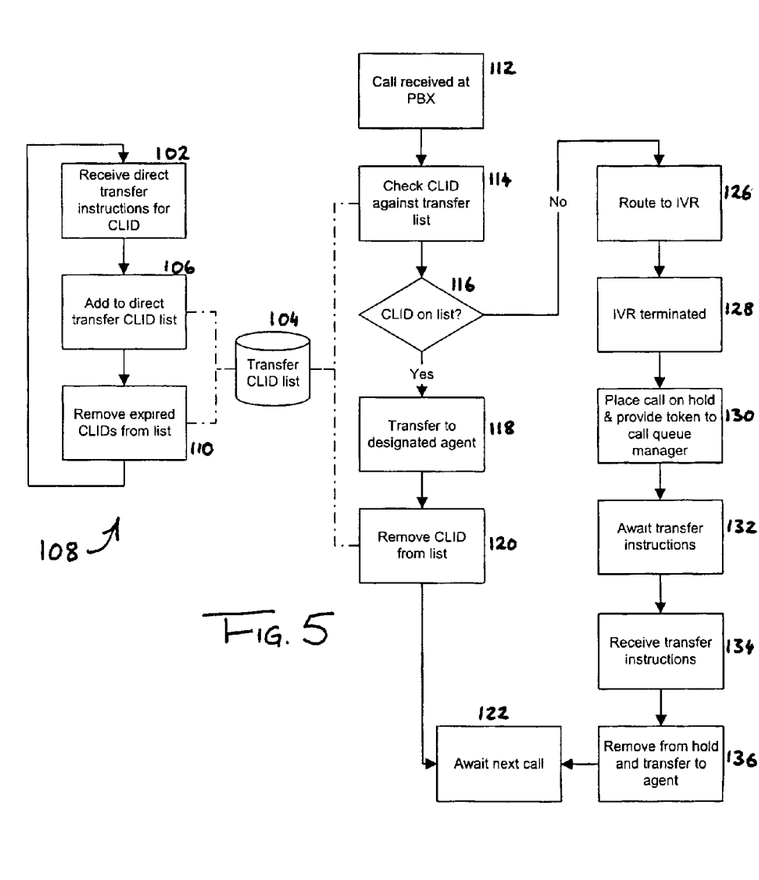
FIG. 5 is a flowchart illustrating the steps of a method according to the invention carried out on a private branch exchange of a call center.

The PBX operates as illustrated in FIG. 5. It maintains a "transfer CLID list" 104 in which it records CLIDs for which instructions have been received from the call queue manager to effect a direct transfer to an agent. (step 102). Each entry in this list will be timestamped at the point when it is added to the list, step 106, and periodically the subprocess 108 which maintains this list will remove, in step 1 10, CLIDs which are determined to be expired (the time to expiry may be of the order of a minute or two, i.e. sufficient time for the trigger signal to be acted on by the executable component, for the user to confirm that the call should be received, and for the call to be placed and received across the PSTN, with an allowance for normal delays and/or redials. (At this point it should be noted that rather than identifying the incoming call by the CLID method being described, the dialler application can instead be supplied with a dial-up number for a dedicated and unadvertised line reserved for triggered calls, with every call received on this line being assumed to be a valid triggered call. This also decreases the likelihood of the customer obtaining a busy number. This is unsatisfactory, however if the system is widely used and a customer can determine from the phone's dialled numbers record which number was called. Therefore positive identification of the source of an incoming call, such as with CLID matching, is preferred.)

As calls are received at the PBX, step 112, the first action taken by the PBX is to determine in step 114 whether the call is a triggered call, as notified by the call queue manager and recorded in the transfer list. If the call is from a device to which a trigger signal was recently sent the CLID it will be determined in step 116 that this is the case and the call will be transferred, step 118, to the extension of the agent specified by the call queue manager in step 102. This initial vetting of calls prevents the call from ever entering the queue system. The CLID is then removed from the transfer list, step 120, and the PBX awaits the next call, step 122.

On the other hand, if the CLID is not found on the transfer list in step 116, the call is treated normally. In this example, this involves routing the call to the IVR system 30, step 126, and after the IVR menus have been navigated, step 128 (and if the caller has not hung up, as may be the case if the IVR system can satisfy the customer's query), the call is placed on hold, step 130. At this point the PBX provides a call token to the call queue manager, triggering step 66 in FIG. 4 and awaits transfer instructions from the call queue manager, step 132. When the call queue manager instructs the PBX to make a transfer, step 134, the call is taken off hold and is transferred to the agent extension specified by the call queue manager, step 136. The PBX then awaits the next call, step 122.

The PBX functionality described above requires that the PBX is an intelligent device. However, many existing PBX systems do not have the required functionality to carry out this process.

In such cases, the preferred embodiment is for the PBX to act as a slave to the call queue manager. Incoming calls are notified to the call queue manager which maintains the CLID transfer list internally. The call queue manager then compares the incoming CLID with the list and instructs the PBX either to transfer the call directly to a specified agent or queue it as normal.

Figure 6:
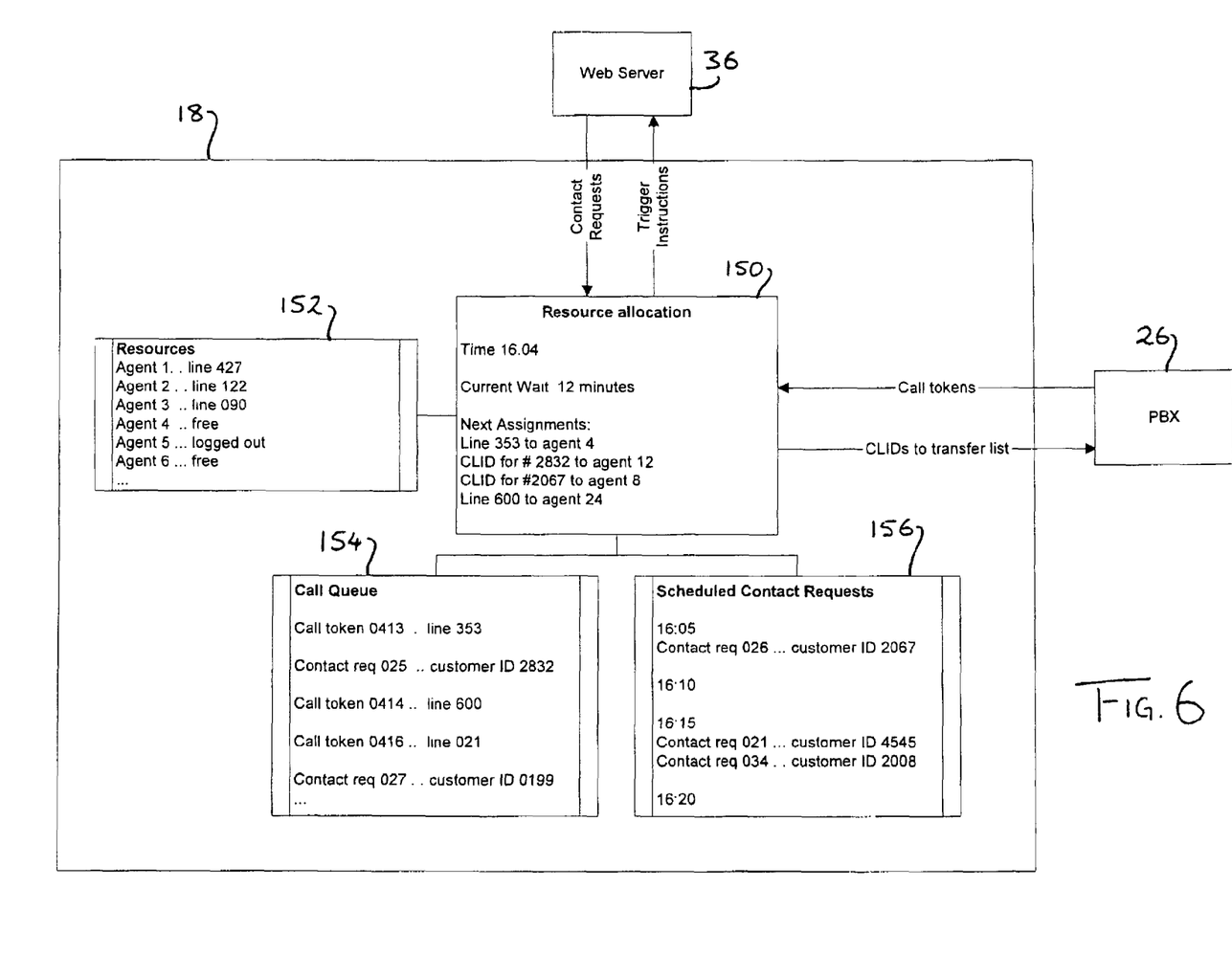
FIG. 6 is a schematic diagram indicating the main functional components of a call centre according to the invention.

FIG. 6 is a simplified illustration of the main functional components of the call queue manager 18. A resource allocation application 150 is programmed to monitor a list of current resources 152 in which the status of each agent of the call centre is updated. It can be seen that in this example, the first three agents are currently on calls, agent 5 is logged out, and agents 4 and 6 among others are free to take a call.

A call queue 154 is continually updated with call tokens and contact requests as described above. In addition a list of scheduled contact requests 156 is maintained in which customers have specified a time at which they have reserved a call to the call centre (this can be provided as an option on the web server 36, in addition to the simpler system previously described in which a contact request is submitted and the trigger received when an agent becomes free. Thus it can be seen that customers 2832 and 0199 have simply submitted a contact request and are therefore added to the queue 154 (as contact requests 025 and 027), whereas customer 2067 has booked a slot in the scheduled list 156 at 16:05 and customers 4545 and 2008 have each booked a slot at 16:15. There are no calls booked for 16:10. The top of queue 154 also contains call tokens provided by the PBX 26 in respect of held calls on lines 353, 600 and 021 in order of seniority.

The resource allocation application 150 manages the queue 154 and scheduled list 156 by adding call tokens received from the PBX 26 to the queue and contact requests received from the web server 36 to the queue or the scheduled list as appropriate. The resource allocation application 150 tracks the current time, and as agents become free, assigns them to calls or contact requests from the queue and scheduled list. Thus, agent 4, who is currently free, has been assigned to the call on line 353 at the top of the queue. Agent 12 has been assigned to the next queued item, contact request 025, and as the time is approaching 16:05, the next available agent, agent 8, has been assigned to deal with scheduled contact request 026.

At this point, the resource allocation application 150 will instruct the PBX to transfer the call held on line 353 to agent 4, and will instruct the web server to issue trigger signals to customers 2832 and 2067. When these trigger signals have been received and confirmed, the resource allocation application 150 will supply to the PBX the expected CLID for the devices registered to customers 2832 and 2067, and these will be added to the transfer list, along with an indication that when the calls are received they should be transferred to agents 12 and 8 respectively.

Finally, the resource allocation application 150 maintains an estimate of the current wait which a calling customer can expect to hold for. This is of use in providing information to customers when their call is answered and can be supplied to the web server allowing it to dynamically build the web page on which scheduled requests are submitted, so that only available slots are presented to the customer.

It will be appreciated that the contact requests can be submitted in a variety of ways in addition to web-based requests. A short messaging system (SMS text message) server can receive, parse and process requests. Requests can also be submitted by email, or a registered customer can opt to record a contact request as part of the IVR session encountered by all holding callers (e.g. by entering a customer number and password to a DTMF or voice recognition system, the request could be recorded and the customer told to hang up and await activation of the executable component (which in this case would need to be present on the customer's device already).

Additionally, the device registered to the customer need not be a dedicated phone, as the invention can be implemented on the customer side on a conventional computer running telephony software. It should also be appreciated that the PBX need not receive the triggered call via the PSTN since IP telephony can equally be used to contact the call centre. Furthermore, the call in question might be a video call rather than voice only.

As a further suggested modification, the call queue manager may process the contact requests slightly ahead of call tokens (i.e. before the contact request reaches the top of the queue) if it is determined that the assignment of contact requests to agents results in an unacceptable delay before the call is triggered and received by the agent. Alternatively, the contact request can be processed at the top of the queue but not assigned to a particular agent. The PBX would then receive the call, recognise the CLID from the transfer list, and rather than directing it to an agent, would request the call queue manager for directions as to which agent should receive the call. This is particularly applicable in large call centres where one expects that there will always be a small pool of agents who have just finished calls, and so whenever a triggered call is received, the call queue manager can immediately provide the PBX with a destination extension.

The invention is not limited to the embodiments disclosed herein which may be departed from or varied within the scope of the claimed invention.

What is claimed is:

1. A method of initiating a telephony communication from a telecommunications device to a target, said method comprising:
   a) submitting a request to the target to provide a trigger signal;
   b) said telecommunications device monitoring a communications channel for receipt of said trigger signal; and
   c) upon receipt of said trigger signal, said telecommunications device initiating said communication to said target;
   wherein said telecommunications device is selected from a computer having telephony software installed thereon, and a programmable telephone.

2. A method as claimed in claim 1, wherein the trigger signal includes a telephony identifier which identifies the target and enables communication with the target to be initiated.

3. A method as claimed in claim 2, wherein said telephony identifier is selected from a public switched telephony network telephone number, a private telephony network directory number, and a data network address.

4. A method as claimed in claim 1, further comprising the initial step of providing a telephony identifier to said telecommunications device which identifies the target and enables communication with the target to be initiated, whereby on receipt of said trigger signal said telephony identifier is used to initiate said communication.

5. A method as claimed in claim 4, wherein said telephony identifier is selected from a public switched telephony network telephone number, a private telephony network directory number, and a data network address.

6. A method as claimed in claim 1, wherein the telecommunications device is provided with a plurality of communications channels and wherein the trigger signal is received over a different channel to the channel used to initiate said communication.

7. A method as claimed in claim 1, wherein the steps of the method are accomplished by software running on said telecommunications device.

8. A telecommunications device comprising:
   a) an interface for submitting a request to a target to provide a trigger signal;
   b) a communications channel monitor for detecting receipt of a trigger signal from the target over a communications channel; and
   c) an automated contact system for initiating a telephony communication to the target upon receipt of said trigger signal;
   wherein said telecommunications device is selected from a computer having telephony software installed thereon, and a programmable telephone.

9. A method of operating a call centre, comprising the steps of:
   a) receiving a contact request relating to a remote device selected from a computer having telephony software installed thereon, and a programmable telephone;
   b) prioritising said contact request according to a set of rules which determine when said request is due to be processed;
   c) when it is determined that said contact request is to be processed, forwarding to said remote device a trigger signal for causing the remote device to initiate a telephony communication with the call centre; and
   d) associating an incoming telephony communication with said contact request and directing said incoming communication to an agent.

10. A method as claimed in claim 9, wherein step a) comprises receiving said request from a request processing device selected from a web server, an interactive voice response server, a short messaging system server, an email saver and a session initiation protocol (SIP) application.

11. A method as claimed in claim 9, wherein the identity of the telecommunications device to which the request relates is determined with reference to a database of call centre customers.

12. A method as claimed in claim 9, wherein step b) comprises queuing said request with a plurality of other requests and processing said requests in turn.

13. A method as claimed in claim 12, wherein said plurality of other requests include requests associated with real time calls currently queued at a call server of the centre.

14. A method as claimed in claim 9, wherein step b) comprises scheduling said request for processing at a time specified in the request and processing said request at said specified time.

15. A method as claimed in claim 9, wherein step a) includes the step of transmitting to said remote device a program which when run by the telecommunications device (i) monitors a communications channel for said trigger signal and (ii) reacts to said trigger signal by initiating communication with said call centre.

16. A method as claimed in claim 15, wherein said program includes a telephony identifier sufficient to enable said communication to be initiated.

17. A method as claimed in claim 15, wherein said trigger signal includes a telephony identifier sufficient to enable said communication to be initiated.

18. A method as claimed in claim 9, wherein step d) comprises receiving notification of an incoming call, determining from the information in the notification whether said call relates to an existing request, and if said call does not relate to an existing request, creating and prioritising a new request relating to said call.

19. A method as claimed in claim 18, wherein said requests are prioritised by a queue management unit, and incoming calls are managed by a switching device operative under the direction of the management unit to hold or forward received calls, said queue management unit instructing the switching unit to hold calls which do not relate to an existing request until that request is processed.

20. A call centre comprising:
 a) a management system for receiving, prioritising and processing contact requests relating to remote devices;
 b) a trigger signal generation unit for generating and transmitting a trigger signal to a remote device when a contact request relating to that device is processed, said remote device being selected from a computer having telephony software installed thereon, and a programmable telephone; and
 c) a call recognition system for associating an incoming call with a processed contact request relating to the device making the incoming call; and
 d) a call switching unit for forwarding an incoming call to an agent under the direction of the call recognition system.

21. A computer program product comprising instructions which when executed in a call centre computer system are effective to cause said system to:
 a) receive a contact request relating to a remote device, said remote device being selected from a computer having telephony software installed thereon, and a programmable telephone;
 b) prioritise said contact request according to a set of rules which determine when said request is due to he processed;
 c) when it is determined that said contact request is to be processed, forward to said remote device a trigger signal for causing the remote device to initiate a telephony communication with the call centre; and
 d) associate an incoming telephony communication with said contact request and directing said incoming communication to an agent.

22. A method of initiating a call between a telecommunications device and a call centre, said method comprising:
 a) the call centre receiving a contact request to provide a trigger signal to the device;
 b) the call centre prioritising said contact request according to a set of rules which determine when said request is due to be processed;
 c) when it is determined that said contact request is to be processed, the call centre forwarding to said remote device a trigger signal for causing the remote device to initiate a telephony communication with the call centre;
 d) the telecommunications device monitoring a communications channel for receipt of said trigger signal;
 e) upon receipt of said trigger signal, the telecommunications device initiating said communication as a call to said call centre; and
 f) the call centre associating said incoming call with said contact request and directing said incoming communication to an agent;
 said telecommunications device being selected from a computer having telephony software installed thereon, and a programmable telephone.

23. A telecommunications system comprising a telecommunications device and a call centre connected to one another over a telephony network, wherein said telecommunications device is selected from a computer having telephony software installed thereon, and a programmable telephone and said telecommunications device comprises:
 a) an interface for submitting a contact request to a target to provide a trigger signal;
 b) a communications channel monitor for detecting receipt of a trigger signal from the target over a communications channel; and
 c) an automated contact system for initiating a telephony communication to the target upon receipt of said trigger signal.
and said call centre comprises:
 d) a management system for receiving, prioritising and processing said contact request;
 e) a trigger signal generation unit for generating and transmitting said trigger signal to said device when said contact request relating to that device is processed; and
 f) a call recognition system for associating said telephony communication when received as an incoming call with said processed contact request relating to said device; and
 g) a call switching unit for forwarding said incoming call to an agent under the direction of the call recognition system.

* * * * *